United States Patent
Varrin et al.

(10) Patent No.: US 7,344,602 B2
(45) Date of Patent: *Mar. 18, 2008

(54) SCALE CONDITIONING AGENTS AND TREATMENT METHOD

(75) Inventors: Robert D Varrin, Reston, VA (US); Michael W. Rootham, Delmont, PA (US)

(73) Assignee: Dominion Engineering, Inc., Reston, VA (US)

( * ) Notice: Subject to any disclaimer, the term of this patent is extended or adjusted under 35 U.S.C. 154(b) by 275 days.

This patent is subject to a terminal disclaimer.

(21) Appl. No.: 10/762,500

(22) Filed: Jan. 23, 2004

(65) Prior Publication Data

US 2004/0149310 A1     Aug. 5, 2004

Related U.S. Application Data

(63) Continuation of application No. 09/884,439, filed on Jun. 20, 2001, now Pat. No. 6,740,168.

(51) Int. Cl.
*F28G 9/00*     (2006.01)

(52) U.S. Cl. .................... 134/3; 134/1; 134/2; 510/247

(58) Field of Classification Search ...................... None
See application file for complete search history.

(56) References Cited

U.S. PATENT DOCUMENTS

| | | | |
|---|---|---|---|
| 3,996,062 A | 12/1976 | Frost et al. | |
| 4,045,253 A * | 8/1977 | Banks et al. | 148/250 |
| 4,578,162 A * | 3/1986 | McIntyre et al. | 205/335 |
| 4,586,961 A | 5/1986 | Bradley et al. | |
| 4,632,705 A * | 12/1986 | Baum | 134/3 |
| 4,899,697 A | 2/1990 | Franklin et al. | |
| 4,921,662 A | 5/1990 | Franklin et al. | |
| 4,972,805 A | 11/1990 | Weems | |
| 5,006,304 A | 4/1991 | Franklin et al. | |
| 5,019,329 A | 5/1991 | Franklin et al. | |
| 5,092,280 A | 3/1992 | Franklin et al. | |
| 5,092,355 A | 3/1992 | Cadwell et al. | |
| 5,601,657 A * | 2/1997 | Baum | 134/3 |
| 4,720,306 A | 1/1998 | Emmert et al. | |
| 5,764,717 A * | 6/1998 | Rootham | 376/316 |
| 5,779,814 A | 7/1998 | Fellers, Sr. et al. | |
| 5,814,204 A * | 9/1998 | D'Muhala | 205/705 |
| 5,841,826 A * | 11/1998 | Rootham et al. | 376/316 |
| 6,017,399 A | 1/2000 | Fellers, Sr. et al. | |
| 6,740,168 B2 * | 5/2004 | Rootham et al. | 134/3 |

OTHER PUBLICATIONS

W. Frenier and F. Growcock, ""Mechanism of Iron Oxide Dissolution—A Review of Recent Literature"," Corrosion, vol. 40 (No. 12), p. 663-668, (Dec. 23, 1984).

* cited by examiner

*Primary Examiner*—Gregory Webb
(74) *Attorney, Agent, or Firm*—Pillsbury Winthrop Shaw Pittman LLP

(57) ABSTRACT

An improved scale conditioning composition and method is disclosed that results in improved dissolution and disruption of tube scale, hardened sludge and other deposits composed primarily of highly densified magnetite such as those found in heat exchange vessels, particularly steam generators. After treatment with the advanced scale conditioning composition, these magnetite rich deposits are more easily removed using known and commercially available high pressure hydro-mechanical cleaning techniques. The present invention further provides effective cleaning in a short period of time and at relatively low temperatures, while reducing the amount of waste produced and reducing the resulting corrosion of carbon and low alloy steel components within the steam generator during the cleaning process.

34 Claims, No Drawings

SCALE CONDITIONING AGENTS AND TREATMENT METHOD

CROSS REFERENCE TO RELATED APPLICATION

This application is a continuation of U.S. patent application No. 09/884,439, filed on Jun. 20, 2001 now U.S. Pat. No. 6,740,168.

BACKGROUND OF THE INVENTION

The invention relates to an advanced formulation scale conditioning process and composition for enhancing the removal of films, scales, and sludge deposits from industrial process vessels, such as shell and tube heat exchangers, boilers, and steam generators.

Metal surfaces exposed to water or aqueous solutions over long periods of time in closed heat transfer systems develop scales and/or become covered by sludge and other deposits, regardless of the system water purity levels. For example, in commercial electric power generating plants, after on-line operation at temperatures of 200° C. or more, large shell and tube heat exchangers, such as those known as nuclear steam generators, develop adherent scales and/or sludge deposits on the secondary side surfaces of tubes, tube sheets, tube support plates, and other internal structural parts. These troublesome scales and deposits form even in those instances in which the purity of the water may be controlled to levels at or below parts per million. Over a period of time, the accumulation of these scales and sludge will have an adverse effect on the operational performance of the steam generators.

Various off-line cleaning methods have been developed to remove the scales and sludge built up on the internal surfaces of heat exchangers used to generate steam. Commercially successful methods include: pressure pulsing with shock waves; water slapping; chemical cleaning at elevated temperatures, using a variety of chelants at concentrations ranging between approximately 5 and 25%; use of scale conditioning agents at elevated pH (around 10.5); and flushing with high pressure water. Both pressure pulse and chemical methods for cleaning the interior of heat exchanger vessels such as the secondary sides of nuclear steam generators are known in the prior art. U.S. Pat. No. 4,899,697 (Franklin, et al.), U.S. Pat. No. 4,921,662 (Franklin, et al.), U.S. Pat. No. 5,006,304 Franklin, et al.), U.S. Pat. No. 5,092,280 (Franklin, et al.), and U.S. Pat. No. 5,092,355 (Cadwell, et al.) all disclose pressure pulse cleaning methods and devices to loosen and remove sludge and debris from heat exchanger surfaces within the secondary side of nuclear steam generators by means of shock waves introduced in water. U.S. Pat. No. 5,019,329 (Franklin, et al.) discloses an improved cleaning method for the secondary side of nuclear steam generators by means of vertically flushing the secondary side of nuclear steam generators during pressure pulse or other shock wave type cleaning operations.

The scale conditioning agent formulations disclosed in U.S. Pat. No. 5,764,717 to Rootham and U.S. Pat. No. 5,841,826 to Rootham et al. were designed to minimize interaction with magnetite, the principal component of most scale and hardened sludge deposits. The advanced formulation scale conditioning agents of the present invention, however, have the ability both to interact with magnetite causing controlled dissolution and to assist in removing copper and silicate enriched hydrothermal minerals. Highly densified magnetite generally resists penetration by prior art scale conditioning agents comprising combinations of strongly basic amines and intercalation agents. The improved scale conditioning agents of the present invention, however, by overcoming overcoming these limitations, are especially useful in removing scales and other deposits which are composed principally of homogenous and highly densified magnetite.

SUMMARY OF THE INVENTION

It is an object of the present invention to provide an effective method for the partial dissolution, softening, and disruption of tube scale, hardened sludge and other deposits composed primarily of highly densified magnetite that are present within heat exchange vessels, in particular the interior of the secondary side of a nuclear steam generator. After treatment with the advanced scale conditioning agent these deposits are more easily removed using commercially available high pressure hydro-mechanical cleaning techniques such as CECIL™, pressure pulse cleaning (PPC), and upper bundle hydraulic cleaning (UBHC). The method according to the present invention, however, is effective in cleaning in a short period of time and at low temperatures, generating a minimum amount of liquid radioactive waste, and minimizing corrosion of carbon and low alloy steel components within the steam generator during the cleaning process.

Generally speaking, the invention is an improved method for chemically removing and disrupting scale, sludge, corrosion products and other deposits from the interior of a heat exchanger vessel such as the interior of a nuclear steam generator that eliminates, or at least ameliorates shortcomings associated with the prior art. The method of the invention generally comprises the steps of introducing a dilute aqueous solution of additives into the interior of a heat exchanger vessel (for example, the secondary side of a nuclear steam generator). The solution introduced into the heat exchanger reacts with the deposits to partially dissolve the densified magnetite in a controlled manner and modify the structure of the remaining deposits such that they are more easily removed using known hydro-mechanical cleaning techniques. The present invention achieves the partial dissolution of the magnetite and modification of the deposit structure without causing excessive corrosion of carbon and low alloy steel structural components within the steam generator and without using a corrosion inhibitor. Upon completion of the scale conditioning process (the dissolution, softening and disruption of the existing scale and deposits), the cleaning solution is drained from the steam generator. If application of the conditioning solution is performed in conjunction with the application of PPC, a post-conditioning rinse of at least de-ionized water, or a mixture of de-ionized water, hydrazine and optionally, ammonia or one or more amines is preferred to remove cleaning solution residuals. If, however, a hydro-mechanical cleaning process is to be applied to the steam generator after completion of the exposure to the dilute conditioning solution, no such post-conditioning rinse step is required.

In prior art chemical cleaning processes, it was typically necessary to introduce and remove chemical cleaning agents and rinsing solutions a number of times before the sludge and deposits have been effectively removed. In such prior art processes, it was also typically necessary to heat the system during the cleaning process to achieve satisfactory results. Also, in the prior art many of the cleaning agents employed were corrosive and both promoted new and unwanted corrosion of carbon and low alloy steels and/or required an additional neutralization or rinsing step. In some prior art methods, using corrosion inhibitors could decrease this corrosion. However, the inclusion of corrosion inhibitors imposes additional limits, or constraints, on the application temperature of the cleaning process, since these corrosion inhibitors have diminished effectiveness and/or can undergo thermal decomposition as the temperature of the cleaning operation exceeds 120° C. In addition, the waste disposal concerns, including the potential generation of hazardous and/or mixed wastes associated with the prior art processes are eliminated in the new method.

In the method of the invention the dilute aqueous solution of a chemical cleaning agent is formed from a chelant or mixture of chelants which may be ethylenediamine tetraacetic acid (EDTA), hydroxyethyl ethylenediamine triacetic acid (HEDTA), or biodegradable chelants such as lauryl substituted EDTA and/or polyaspartic acid plus imminodisuccinate, or the like; a reducing agent such as ascorbic acid or one of the isomeric forms of ascorbic acid, citric acid, hydrazine, catalyzed hydrazine, carbohydazide, or the like; a pH adjusting compound containing most preferably 1 to 10 carbon atoms, such as a lower alkyl amine or an alkanolamine, or the like; and a low foaming non-ionic surfactant such as Triton X-100, or the like.

The nitrogen containing alkyl amine or alkanolamine is at least one of the group comprising dimethylamine, ethylamine, 1,2-diaminoethane and diaminopropane, ethanolamine, diethanolamine, triethanolamine, 2-methyl-2-amono-1-propanol, 5-aminopentanol, and methoxypropylamine or similar compounds.

In the preferred method, the concentration of the cleaning agent within the aqueous solution is preferably maintained at less than about 1 weight percent, more preferably at less than 0.5 weight percent, and most preferably at between about 0.05 and 0.25 weight percent, based on the total solution. Although these concentrations have been found to be generally sufficient to partially remove and disrupt the scale, sludge, and other deposits effectively, other concentrations may be useful in particular applications. The preferred temperature of application for the cleaning process is less than 80° C. more preferably in the range of approximately 30-60° C., and most preferably approximately 30° C. The preferred pH range for application of the cleaning process is between pH 4 and pH 8.5, and preferably between pH 4.5 and pH 6. As those of ordinary skill in the art will appreciate, heat exchange systems are not identical and, as a result of variations in parameters such as water composition, operating temperature, and exchanger design, have somewhat unique cleaning requirements. In selecting an appropriate cleaning method, therefore, it is typical to customize both the chemical cleaning composition and the application parameters to some degree based on plant specific testing. Such common adjustments in the cleaning composition and the application parameters are, therefore, consistent with the scope of the present invention.

DETAILED DESCRIPTION OF THE PREFERRED EMBODIMENTS

The preferred embodiment of the invention is particularly useful in assisting deposit removal from the secondary side of a nuclear steam generator. In operation, hot radioactive water from the reactor core flows through the inside of the heat exchanger tubes, transferring much of its heat through the walls of the tubes and into the non-radioactive water surrounding these tubes. This causes the non-radioactive water to boil and create the steam that is used for electrical power generation. During the boiling process scale, sludge, and other deposits accumulate on the free span tube surfaces, in crevices between the tube support plates and the tube walls, in the lobes within support plates, and on horizontal surfaces such as tube sheets and the upper surfaces of tube support plates. Chemical analysis has shown that the principal component of the sludge, tube scale, and other secondary side deposits is magnetite, together with trace amounts of copper, copper oxide, and siliceous minerals.

The cleaning solution is an aqueous solution of demineralized water containing a dilute cleaning agent that may include a chelant or mixture of chelants, a reducing agent, a pH control agent and a non-ionic surfactant. The effectiveness of the cleaning method is determined by the ability to control the rate of the reaction between the chelant and magnetite. When the reaction between the chelant and the magnetite present in the deposit proceeds slowly the chelant not only reacts at the surface of the deposit, but also penetrates below the surface to increase porosity within the deposit and promote laminar dissolution of the magnetite. These reactions result in undercutting of the magnetite and the dissolution of minor components, such as copper and siliceous compounds, within the deposit matrix. The chelant, or mixture of chelants, may be selected from a group comprising EDTA, HEDTA, and biodegradable chelants such as lauryl substituted EDTA and/or polyaspartic acid plus imminodisuccinate. The preferred chelants are EDTA and its saponified derivatives. The reducing agent may be ascorbic acid or one of the isomeric forms of ascorbic acid, citric acid, hydrazine, catalyzed hydrazine, or carbohydazide. The preferred reducing agents are ascorbic acid and its isomers, since these compounds are effective throughout the preferred pH range. The pH adjusting compounds contain 1 to 10 carbon atoms, such as a lower alkyl amine or an alkanolamine. The preferred alkalizing agents are alkanolamines because prior testing has shown that alkanolamines extend the effective pH range for the chelation of iron by EDTA. The preferred low foaming non-ionic surfactant is Triton X-100, or a surfactant with an equivalent formulation.

The preferred concentration of the chelating agent in the water component of the solution is less than 1 weight percent, preferably less than 0.5 weight percent, and most preferably between about 0.05 and 0.25 weight percent. The inventors have found that within this concentration range, the rate of reaction between the chelant and magnetite is slow enough both to maximize the dissolution of minor components within the deposit and to minimize the corrosion of carbon and low alloy steel components within the steam generator. In addition, if local environmental discharge requirements preclude direct release of the spent cleaning solution to the environment, the spent cleaning solution can be absorbed readily onto ion exchange resin or resins for disposal as solid waste. The concentrations of the reducing agent, and pH control agent are determined by the selected chelant and its concentration. The preferred concentration for the surfactant is less than 100 ppm, and preferably in the range of 1 to 10 ppm to minimize the potential for foaming during liquid transfer and mixing. The preferred temperature of application for the cleaning process is less than 80° C., preferably in the range of approximately 30 to 60° C., and most preferably approximately 30° C. Although the rate of reaction between the chelant and magnetite is temperature dependent, the inventors have found that the reaction between the chelant and magnetite is generally well controlled in this temperature range. The preferred pH range for application of the cleaning process is between pH 4 and pH 8.5, and more preferably between pH 4.5 and pH 6. The inventors have found that the corrosion of carbon and low alloy steels is minimized, and the rate of reaction between the chelant and magnetite is well controlled within these pH ranges.

Under the preferred conditions, corrosion testing using non-passivated coupons has shown metal loss rates for typical steam generator secondary side carbon and low alloy steels to be in the range of 0.0002 to 0.0003 inch per application of the cleaning process. This low, and extremely conservative, rate of corrosion permits numerous applications of the cleaning process. Typically, the limiting per application corrosion rate for the chemical cleaning of nuclear steam generators is in the range of 0.002 to 0.003 inch, and the maximum number of cleaning applications that may be performed at the limiting corrosion rate is three.

According to the present method, the conditioning solution may be prepared by feeding the appropriate amounts of one or more premixed concentrated solutions or the individual components into the cleaning water to form the dilute aqueous solution. The dilute aqueous solution is introduced into the heat exchanger, followed by flow induced mixing and/or sparging with an inert gas to control the rate and extent of chelant uptake by the magnetite. This preferred process may be performed with or without in-process replenishment of the cleaning solution.

The invention having been disclosed in connection with the foregoing embodiment and examples, additional variations will now be apparent to persons skilled in the art. The invention is not intended to be limited to the embodiment specifically mentioned and accordingly reference should be made to the appended claims rather than the foregoing discussion of preferred embodiments and examples to assess the spirit and scope of the invention in which exclusive rights are claimed.

We claim:

1. A method of conditioning and removing scale and deposits from free span tube surfaces within a heat exchange system that utilizes at least one heat transfer liquid to which heat is transferred via the free span tube surfaces, the method comprising:

taking the heat exchange system out of service;

providing in the heat exchange system an aqueous cleaning solution of a scale conditioning agent, the scale conditioning agent comprising a chelant and a reducing agent, the chelant being present in the aqueous cleaning solution at a treatment concentration of less than about 1 weight percent, wherein the free span tube surfaces have scale and deposits accumulated thereon when the aqueous solution is provided in the heat exchange system;

removing substantially all of the aqueous cleaning solution from the heat exchange system after a treatment period; and returning the heat exchange system to service.

2. The method of claim 1, further comprising:

before providing in the heat exchange system the aqueous cleaning solution, removing at least a portion of the heat transfer liquid from the heat exchange system; and after removing substantially all of the aqueous cleaning solution from the heat exchange system, introducing replacement heat transfer liquid.

3. The method of claim 1, wherein the scale conditioning agent further comprises a pH control agent.

4. The method of claim 3, further comprising maintaining the aqueous cleaning solution at a treatment pH of between pH 3.5 and pH 9 during the treatment period.

5. The method of claim 4, wherein the treatment pH is between pH 4.5 and pH 6.

6. The method of claim 3, wherein the scale conditioning agent further comprises a non-ionic surfactant.

7. The method of claim 3, wherein:

the chelant comprises at least one chelant selected from a group consisting of EDTA, HEDTA, lauryl substituted EDTA, and polyaspartic acid with imminodisuccinate;

the reducing agent comprises at least one reducing agent selected from a group consisting of ascorbic acid, isomers of ascorbic acid, citric acid, hydrazine, catalyzed hydrazine, and carbohydrazide; and the pH control agent is a nitrogen containing aliphatic compound having fewer than 10 carbons such as triethanolamine, dimethylamine, ethylamine, 1,2-diaminoethane, diaminopropane, ethanolamine, diethanolamine, 2-methyl-2-amono-1-propanol, 5-aminopentanol, or methoxypropylamine.

8. The method of claim 1, wherein providing in the heat exchange system the aqueous cleaning solution of a scale conditioning agent comprises introducing the aqueous cleaning solution into the heat exchange system.

9. The method of claim 1, wherein providing in the heat exchange system the aqueous cleaning solution of a scale conditioning agent comprises forming the aqueous cleaning solution in the heat exchange system.

10. The method of claim 1, further comprising, prior to removing substantially all of the aqueous cleaning solution from the heat exchange system, circulating the aqueous cleaning solution within the heat exchange system during the treatment period.

11. The method of claim 10, further comprising introducing additional scale conditioning agent during the circulating the aqueous cleaning solution.

12. The method of claim 11, wherein the additional scale conditioning agent is introduced into the heat exchange system as a concentrated premix solution, the introduction of the additional scale conditioning agent being sufficient to maintain the chelant at the treatment concentration.

13. The method of claim 1, further comprising maintaining the aqueous cleaning solution at a treatment temperature of less than 100° C. during the treatment period.

14. The method of claim 13, wherein the treatment temperature is less than 60° C.

15. The method of claim 1, further comprising agitating the aqueous cleaning solution during the treatment period.

16. The method of claim 15, wherein the agitating the aqueous cleaning solution comprises flow induced mixing, inert gas sparging, or a combination of the two methods.

17. The method of claim 1, wherein the treatment concentration is between 0.05 and 0.25 weight percent.

18. The method of claim 1, further comprising, before returning the heat exchange system to service, introducing an aqueous rinse solution into the heat exchange system;

performing at least one hydro-mechanical cleaning operation; and removing substantially all of the aqueous rinse solution; and introducing replacement heat exchange liquid into the heat exchange system.

19. The method according to claim 1, wherein the heat exchange system comprises a steam generator.

20. The method according to claim 1, wherein the steam generator comprises a nuclear steam generator.

21. The method according to claim 1, wherein the method induces corrosion of less than 0.001 inch per application in carbon and low allow steels between taking the heat exchange system out of service and returning the heat exchange system to service.

22. The method according to claim 1, further comprising increasing a porosity of an iron oxide portion of deposits in the heat exchange system before removing substantially all of the aqueous cleaning solution from the heat exchange system.

23. The method according to claim 1, wherein:
the heat exchange system forms part of a secondary side of a nuclear steam generator; and
the method further comprises releasing the used aqueous cleaning solution into the environment as conventional industrial waste, rather than radioactive waste.

24. A method of conditioning and removing scale and deposits within a heat exchange system that utilizes at least one heat transfer liquid, the method comprising:
taking the heat exchange system out of service;
providing in the heat exchange system an aqueous cleaning solution of a scale conditioning agent, the scale conditioning agent comprising a chelant and a reducing agent;
removing substantially all of the aqueous cleaning solution from the heat exchange system after a treatment period;
returning the heat exchange system to service; and
between taking the heat exchange system out of service and returning the heat exchange system to service, inducing corrosion of less than 0.001 inch in carbon and low allow steels.

25. The method according to claim 24, wherein, between taking the heat exchange system out of service and returning the heat exchange system to service, the inducing corrosion comprises inducing corrosion of between 0.0002 and 0.0003 inch in carbon and low allow steels.

26. The method according to claim 24, further comprising increasing a porosity of an iron oxide portion of deposits in the heat exchange system before removing substantially all of the aqueous cleaning solution from the heat exchange system.

27. The method according to claim 24, wherein:
the heat exchange system forms part of a secondary side of a nuclear steam generator; and
the method further comprises releasing the used aqueous cleaning solution into the environment as conventional industrial waste, rather than radioactive waste.

28. A method of conditioning and removing scale and deposits within a heat exchange system that utilizes at least one heat transfer liquid, the method comprising:
taking the heat exchange system out of service;
providing in the heat exchange system an aqueous cleaning solution of a scale conditioning agent, the scale conditioning agent comprising a chelant and a reducing agent;
increasing a porosity of an iron oxide portion of deposits in the heat exchange system;
removing substantially all of the aqueous cleaning solution from the heat exchange system; and
returning the heat exchange system to service.

29. A method of conditioning and removing scale and deposits within a heat exchange system that forms part of a secondary side of a nuclear steam generator and utilizes at least one heat transfer liquid, the method comprising:
taking the heat exchange system out of service;
providing in the heat exchange system an aqueous cleaning solution of a scale conditioning agent, the scale conditioning agent comprising a chelant and a reducing agent;
removing substantially all of the aqueous cleaning solution from the heat exchange system; and
releasing the used aqueous cleaning solution into the environment as conventional industrial waste, rather than radioactive waste.

30. The method of claim 1, wherein no cleaning techniques are used to remove scale and deposits from free span tube surfaces between the taking of the heat exchange system out of service and the providing in the heat exchange system of the aqueous solution.

31. The method according to claim 28, wherein increasing the porosity comprises increasing the porosity of the iron oxide portion of deposits on free span tube surfaces of a secondary side of the heat exchange system.

32. The method according to claim 29, wherein no cleaning techniques are used to remove scale and deposits from the secondary side of the nuclear steam generator between the taking of the heat exchange system out of service and the providing in the heat exchange system of the aqueous solution.

33. The method of claim 1, further comprising between providing in the heat exchange system the aqueous cleaning solution and removing substantially all of the aqueous cleaning solution, chelating and removing iron oxide deposits from within the heat exchange system.

34. The method of claim 1, further comprising maintaining the treatment concentration at a uniform level between providing the aqueous cleaning solution in the heat exchanger and removing substantially all of the aqueous cleaning solution.

* * * * *